(12) United States Patent
Ge et al.

(10) Patent No.: US 12,395,334 B2
(45) Date of Patent: Aug. 19, 2025

(54) LOOP ARRAY MAPPING METHOD OF SHARED BALANCE OPERATOR BASED ON RECONFIGURABLE CRYPTOGRAPHIC ALGORITHM

(71) Applicant: SOUTHEAST UNIVERSITY, Nanjing (CN)

(72) Inventors: Wei Ge, Nanjing (CN); Chongyang Li, Nanjing (CN); Mingfeng Zhang, Nanjing (CN); Shuhe Liu, Nanjing (CN); Shenian Wei, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 169 days.

(21) Appl. No.: 18/349,500

(22) Filed: Jul. 10, 2023

(65) Prior Publication Data
US 2024/0223367 A1    Jul. 4, 2024

(30) Foreign Application Priority Data
Dec. 28, 2022   (CN) .......................... 202211696961.1

(51) Int. Cl.
*H04L 9/16*    (2006.01)
(52) U.S. Cl.
CPC ..................... *H04L 9/16* (2013.01)
(58) Field of Classification Search
CPC ....................................................... H04L 9/16
USPC ....................................................... 713/189
See application file for complete search history.

(56) References Cited

U.S. PATENT DOCUMENTS

| 2010/0166177 A1* | 7/2010 | Sirio | H04L 9/003 380/30 |
| 2023/0239138 A1* | 7/2023 | Roach | H04L 9/40 713/171 |

OTHER PUBLICATIONS

Liu et al., *HReA: An Energy-Efficient Embedded Dynamically Reconfigurable Fabric for 13-Dwarfs Processing*, Jul. 18, 2017, IEEE, 5 pages.

Jo et al., *Coarse-grained reconfigurable architecture for multiple application domains: a case study*, International Conference on Convergence and Hybrid Information Technology, Aug. 27, 2009, pp. 546-553.

(Continued)

*Primary Examiner* — Michael S McNally
(74) *Attorney, Agent, or Firm* — MUNCY, GEISSLER, OLDS & LOWE, P.C.

(57) ABSTRACT

A loop array mapping method of a shared balance operator is based on a reconfigurable cryptographic algorithm. The mapping graph is optimized by adopting a balance node operator mode, so that the mapping graph has a smallest iteration interval and a largest pipeline performance, thus solving a problem of poor pipeline performance of manual configuration and saving a great deal of human and mental labor, without adding the balance operator node manually by manual computing. In the present disclosure, a shared balance node operator solution is adopted to process a balance node of the multi-fan-out operator, so that computation resources are minimized and performance is maximized. The storage data unit SREG is used for data transfer and communication, which solves a problem that communication of data between loop bodies occupies more transfer operator resources, saves a lot of hardware resources and further improves pipeline performance.

9 Claims, 6 Drawing Sheets

(56) References Cited

OTHER PUBLICATIONS

Parashar et al., *Triggered instructions: a control paradigm for spatially-programmed architectures*, ICSA, Tel Aviv, Israel, Jun. 23, 2013, ACM, 12 pages.
Sankaralingam et al., TRIPS: A polymorphous architecture for exploiting ILP, TLP, and DLP, ACM Transactions on Architecture and Code Optimization, vol. 1, No. 1, Mar. 1, 2004, pp. 62-93.
Yin et al., Memory-Aware Loop Mapping on Coarse-Grained Reconfigurable Architectures, IEEE Transactions on Very Large Scale Integration (VLSI) Systems, Sep. 22, 2015, 14 pages.
Liu et al., A Survey of Coarse-Grained Reconfigurable Architecture and Design: Taxonomy, Challenges, and Applications, ACM Computing Surveys, vol. 52, No. 6, Article 118., Oct. 16, 2019., pp. 118.1-118.39.
Chin et al., CGRA-ME: A unified framework for CGRA modelling and exploration, IEEE, Jul. 10, 2017, 6 pages.
Chen et al., Efficient scheduling mapping algorithm for row parallel coarse-grained reconfigurable architecture, Tsinghua Science and Technology, vol. 26, No. 5, Apr. 20, 2021, pp. 724-735.
Kojima et al., GenMap: A Genetic Algorithmic Approach for Optimizing Spatial Mapping of Coarse-Grained Reconfigurable Architectures, IEEE Transactions on Very Large Scale Integration (VLSI) Systems, Jul. 27, 2020,14 pages.

* cited by examiner

LOOP ARRAY MAPPING METHOD OF SHARED BALANCE OPERATOR BASED ON RECONFIGURABLE CRYPTOGRAPHIC ALGORITHM

TECHNICAL FIELD

The present disclosure relates to a loop array mapping method of a shared balance operator based on a reconfigurable cryptographic algorithm, which belongs to the technical field of information security.

BACKGROUND

With development and innovation of information technology, the demand for data processing capability of applications in the era of information explosion is constantly increasing. There are two conventional computation methods: One is with an application specific integrated circuit (ASIC), which cannot be changed in hardware circuit once it is put into production because of its specificity and production characteristics. With the increasing complexity of a silicon manufacturing process, one-time investment cost becomes extremely high. Thus, when output of ASIC does not reach a certain scale, a fully customized ASIC acceleration unit can only be adopted by a few computing logics with a large number of application scenarios. The other is with a general purpose processor (GPP), which performs specific computing tasks by means of instruction sets, and completes computing tasks with different functions by modifying an instruction set sequence, without modifying the hardware circuit, and thus the GPP has good flexibility. However, in order to complete a computing task, the GPP needs to read instructions and data from a memory and perform decoding and execution. Every execution of instructions requires a lot of performance overheads, so performance of the GPP is generally far behind the ASIC.

Reconfigurable computing can be essentially regarded as "a compromise between high flexibility of the GPP and high performance of the ASIC, and a combination of time computing and space computing." Meanwhile, the reconfigurable computing is also a compromise between flexibility and area/power consumption, and it has better flexibility than the ASIC. A reconfigurable architecture is a kind of programmable logic device, in which processing units are large logical arrays similar to ALUs, and an interconnection structure is based on a bus. This is in sharp contrast with a field programmable array FPGA. A reconfigurable processor has flexibility and programmability, while its area is smaller and less configuration bits are needed. The reconfigurable architecture is a most suitable choice for some occasions that require programmability and flexibility. Many commercial and academic communities have proposed some supporting compilers to apply the reconfigurable system.

Computational characteristics of cryptographic algorithms will directly affect structural design of the target reconfigurable processor. The cryptographic algorithms can be roughly divided into block cipher algorithm, stream cipher algorithm and digest algorithm and other categories. A ciphertext length of the digest algorithm is fixed and irreversible, and it is mainly used in consistency verification, digital signature and security authentication, etc. The block cipher algorithm and the stream cipher algorithm are reversible cryptographic algorithms, which can be used in all encryption and decryption scenarios, among which the block cipher algorithm is a most widely used cryptographic algorithm. The cryptographic algorithms can be used for encrypting or decrypting a large amount of data in a same form, so unlike ordinary program fragments, one mapping of the cryptographic algorithms on a computing array is usually used by multiple groups of data. Among various encryption modes of the block cipher algorithm, an ECB mode is one of the most commonly used modes. In this mode, encryption of a latter group of data does not depend on an encryption result of a former group of data, so multiple groups of data can be pipelined, which shows that performance of pipeline computing has great influence on performance of the cryptographic algorithm. Therefore, a target array structure must support a function of pipeline computing.

In contrast, automatic mapping has characteristics of high speed and good effect, which avoids shortcomings of manual mapping, so it becomes an indispensable part of the reconfigurable system; and the conventional mature compilation technology cannot be directly applied to reconfigurable mapping problems, making an automatic mapping technology a research hotspot in the field of reconfiguration at present.

At present, research on the reconfigurable processor structure oriented to specialized fields is a hot topic, and the reconfigurable processor oriented to the cryptographic algorithm has become a typical representative because of its wide application scenarios. In order to realize general functions, a calculation form of ordinary computation is often simple and clear, while cryptographic algorithm, as an algorithm in the security field, must decouple ciphertext and plaintext as much as possible in order to improve security of ciphertext. Therefore, a large number of complicated data computation are usually carried out. It can be seen that compared with the ordinary computation, manual mapping of the cryptographic algorithm has more shortcomings in requirements of mapping personnel, mapping time and mapping effect. It not only has high requirement for mapping personnel, long time period and poor loop communication, but also has poor mapping effect and poor mapping pipeline performance. At present, research on reconfigurable technology of the cryptographic algorithm is more biased towards research on its array structure, while others are research on manual mapping solutions for specific cryptographic algorithms. However, research inside and outside of a loop body is a most important part for the cryptographic algorithm. Therefore, research on loop computation operator mapping technology of reconfigurable processors oriented to the cryptographic algorithm is still very urgent, and is of self-evident importance. Based on the above background, mapping design of back end of a compiler of a reconfigurable cryptographic chip oriented to information security has become a hot issue in research. But there is no satisfactory solution at present.

SUMMARY

In view of problems of high requirements for mapping personnel, long time period, poor loop communication, poor mapping effect and poor mapping pipeline performance under a condition that existing mapping technology is not mature enough, the present disclosure analyzes and designs data communication within a loop body and among multi rounds of loop bodies, and proposes a loop array mapping method of a shared balance operator based on a reconfigurable cryptographic algorithm.

To achieve the above objective, the present disclosure provides the following technical solutions.

A loop array mapping method of a shared balance operator based on a reconfigurable cryptographic algorithm includes the following steps:

step 1: computing path lengths of all of paths of a current operation, and obtaining MII of each path according to path length difference between a current path and a maximum path;

step 2: determining whether a currently processed operator is a multi-fan-out operator or not; if the currently processed operator is the multi-fan-out operator, performing step 3; and if the currently processed operator is not the multi-fan-out operator, using a balance node operator for reducing MII of a path guided by the operator;

step 3: for the multi-fan-out operator, computing a minimum value of MII of all of paths guided by the operator, and using the balance node operator as a shared balance node operator for reducing the minimum value of MII;

step 4: after subtracting a shortest path from a path guided by the multi-fan-out operator, determining whether a current shared balance node operator is a multi-fan-out operator or not, and repeating steps 2 and 3 until MII of the paths guided by the multi-fan-out operator is all minimized; and step 5: traversing all of paths of the current operation, and repeating steps 2 to 4 until MII of all of the paths is minimized, and then ending the operation.

Further, the MII in steps 4 and 5 is eliminated to 0.

Further, a way of using the balance node operator includes: adding a balance node operator for data transfer.

Further, the balance node operator adopts a linear basic logic computation unit BFU.

Further, when the balance node operator is used for optimizing a whole mapping graph, two longest input paths among the data paths are optimized firstly; and when the two longest paths are balanced, a second longest input path is selected for optimization analysis until input operator paths are balanced or MII of the input operator paths is minimized in the whole graph.

Further, the shared balance node operator in the multi-fan-out operator path is shared in multiple paths.

Further, in multi rounds of loops, data transfer and communication are carried out through a storage data unit SREG, so that input data received by each input operator of a second round of loop is independent, and performance indexes of a first round of loop are remained in the second round of loop.

Further, it is determined that SREG is used instead of MEM as an intermediate memory when there is data dependency in a round of loop.

Further, the SREG is released after completion of this round of data transfer, and an idle flag is given.

Further, using priority of the SREG is as follows: priority of data dependence in an inner round of loop of cryptographic algorithm is highest, priority of data dependence between cryptographic algorithms is second highest, and priority of the SREG's characteristic shift function is lowest.

Compared with the related art, the present disclosure has the following advantages and beneficial effects.

1. In the present disclosure, the mapping graph is optimized by adopting a balance node operator mode, so that the mapping graph has a smallest iteration interval and a largest pipeline performance, thus solving a problem of poor pipeline performance of manual configuration and saving a great deal of human and mental labor, without adding the balance operator node manually by manual computing.

2. In the present disclosure, a shared balance node operator solution is adopted to process a balance node of the multi-fan-out operator, so that a problem of mapping failure of mapping of a multi-fan-out operator unit under a condition of resource limitation is solved, and computation resources are minimized and performance is maximized.

The storage data unit SREG is used for data transfer and communication, which solves a problem that communication of data between loop bodies occupies more transfer operator resources, saves a lot of hardware resources and further improves pipeline performance.

DETAILED DESCRIPTION

Technical solutions provided by the present disclosure will be described in detail with reference to specific embodiments in the following, and it should be understood that following specific embodiments are only intended to illustrate the present disclosure and are not used to limit the scope of the present disclosure.

Figure 1:
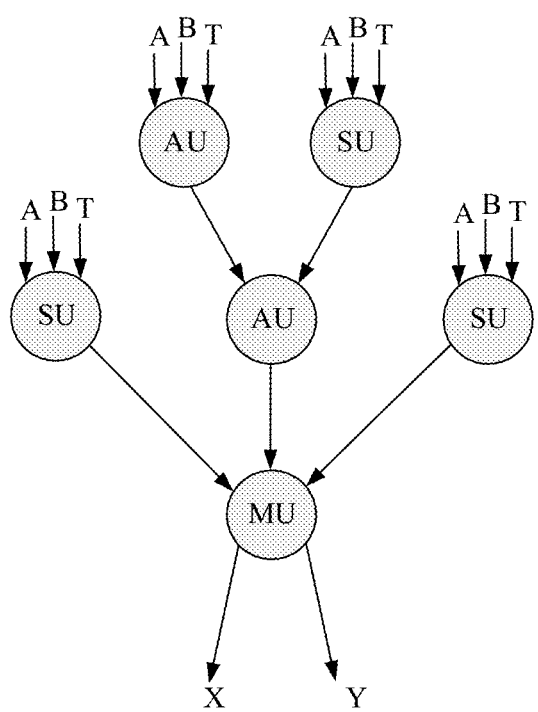
FIG. 1 is a directed data flow graph (DFG) of an input of a mapping process according to the present disclosure.

Design of a chip compiler of a reconfigurable system oriented to information security includes three important processes: front-end primitive input, optimization of intermediate files and back-end mapping. In a process of a back-end mapping solution, there are different mapping solutions for different hardware architectures. An Index that affects compiler effect is mainly performance of the compiler, and a key technical index that affects the performance is parallel computing performance of the mapping graph. An input of the back-end mapping of the reconfigurable processor is mapped to the hardware architecture for a directed data flow graph (DFG). FIG. 1 is a diagram of data dependency represented by an intermediate process generated by a front end of a compiler. It is a directed data flow graph, which represents a direction of data and computing logic functions performed by data, and a final encryption result can be obtained by sequentially executing cryptographic algorithms according to a given data flow graph. In the figure, an arrow represents a data flow direction, and content in circles represents an executable logic operation. Realizable logics include addition, a basic arithmetic logic operation, a shift operation and a multiplication operation respectively. Each operator has three inputs and two outputs. In FIG. 1, AU, SU and MU are respectively an addition unit, a shift unit and a multiplication unit. The parallel computing performance of the mapping graph refers to capability of multiple independent computing units to compute at the same time in reconfigurable computing, which reflects a parallel degree of the mapping solution to a certain extent, and is called parallel computing capability. Because the cryptographic algorithm is a computationally intensive algorithm, and a size of computing array and hardware resources are limited. Each reconfiguration of hardware usually consists of 8 linear basic logic computation units, 4 lookup table units and 1 bit permutation unit. A complete data flow graph of the cryptographic algorithm often needs to be reconstructed many times before it can be realized. Therefore, the data flow graph can be divided into an initial computation round, a loop iteration round and a processing-before-output round according to characteristics of the cryptographic algorithm. Because of complexity of the cryptographic algorithm, it takes a lot of time in the loop iteration round, so the loop iteration round is a design core of a whole mapping solution. However, respective loops are similar or the same, so it is common to explore the mapping solution by taking one round of loop as a subgraph, and finally realize mapping iteration of the whole data flow graph by iterative replication. Based on the parallel mapping solution of a single loop and the data iteration among multi rounds of loops, a parallel pipeline bubble mapping solution oriented to information security is designed in the present disclosure.

Figure 2:
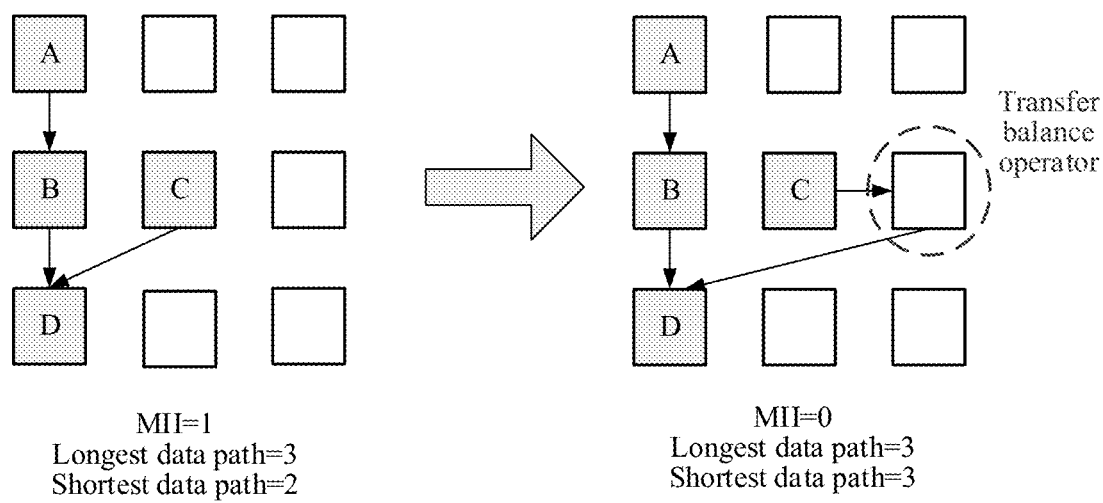
FIG. 2 is an extended input path of an inserted transfer balance operator according to the present disclosure.

A given mapping graph carries dependency between cryptographic algorithm data and operations performed, and the mapping graph can still be further optimized by adjusting routing and other parameters in the array. In the previous research, when faced with special constraints, there may be insufficient optimization or even mapping failure. According to analysis and design of data communication within the loop body and among multi rounds of loop bodies, the present disclosure proposes a loop mapping solution of a shared balance operator node. FIG. 2 is a fixed mapping graph. A→B→D and C→D are two data computation transmission paths, and a short data flow input path length is extended by inserting a balance node operator. As can be seen from the figure, if it takes one time period for each node computation in the figure, arrival time is different because path lengths to the D nodes are different. In pipelined reconfigurable computing, an array of computing units in each period is not the same. Therefore, as long as current computation does not affect data of a previous iteration process, next iteration computation can be started in advance, thus improving pipeline performance. A period between two iteration computation is called an iteration interval (II), and the smaller II is, the higher the pipeline performance is. Therefore, a method for improving the pipeline performance of the present disclosure is implemented by finding a minimum iteration interval (MII). When MII is 0, it represents that the next iteration will start immediately after the previous iteration, and at this time, there are the minimum iteration interval and the maximum pipeline performance. In FIG. 2, A→B→D needs 3 periods, and C→D needs 2 periods. At this time, MII should be 1. If a next iteration computation starts in a next period of starting of the previous computation, that is, MII=0, data of C has been changed at the same time as B arrives, which results in computation error for D data. Therefore, it is necessary to add a balance node operator to transfer the data, so that multiple computation paths of input data are equal. At this time, the MII is 0, the mapping graph has the minimum iteration interval and the maximum pipeline performance.

A BFU (linear basic logic computation unit) is uniformly used as the balance node operator, which can function in single-period data transfer when used. For two operators SBOX (lookup table unit) and BENES (bit permutation unit), specified resource configuration support is needed when data processing is performed, and there is a risk of resource conflict and performance degradation when using these two operators for data transfer. There are 8 BFUs, and an idle BFU is randomly selected as the balance node operator during compilation optimization. When the BFU is used as the balance node operator, one BFU can eliminate one MII in a single period, and idle BFUs can eliminate MII in series in an RCA (reconfiguration operation unit) period, but the BFU cannot be reused, so up to 8 MII values can be eliminated in one RCA period.

Figure 3:
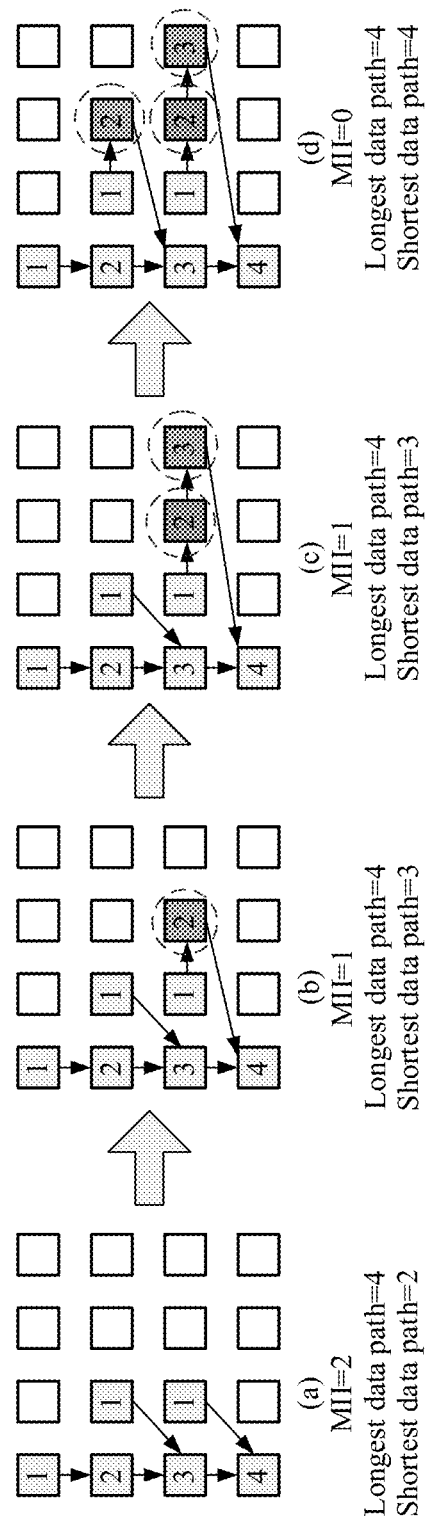
FIG. 3 is an example of a MII optimization process of a mapping graph according to the present disclosure.

It is known from analysis that the minimum iteration interval MII is difference between an input path length of an operator with a latest trigger period and an input path length of an operator with an earliest trigger period. When MII is 0, it means that path lengths of the trigger operators are consistent, and at this time, with balanced operator path input, the maximum pipeline performance can be achieved. As shown in FIG. 3, an example of inserting a balance node operator in a given whole mapping graph is described. For the whole mapping graph, in a solution of inputting balance operator paths by inserting a transfer node operator, two longest input paths among the data paths are optimized firstly. When the two longest paths are balanced, a second longest input path is selected for optimization analysis until input operator paths are balanced in the whole graph. However, for computationally intensive cryptographic algorithms, it is common that one node in the data flow graph is used by multiple paths, so this kind of node operator is called a multi-fan-out node. The solution with the node balance operator inserted to improve performance is very effective for a single-fan-out operator output, but it may cause unnecessary resource performance expenses for the multi-fan-out operator node, and may even result in problems such as algorithm mapping failure with limited resources. Therefore, the present disclosure proposes a solution of a shared balance node operator to deal with such a balance node problem of the multi-fan-out operator. Implementation steps of the shared balance node operator are as follows.

Step 1: Path lengths of all of paths of a current operation are computed, and MII of each path is obtained according to path length difference between a current path and a maximum path.

Step 2: Whether a currently processed operator is a multi-fan-out operator or not is determined. If the currently processed operator is the multi-fan-out operator, step 3 is performed. If the currently processed operator is not the multi-fan-out operator, a balance node operator is used for eliminating MII of a path guided by the operator.

Step 3: For the multi-fan-out operator, a minimum value of MII of all of paths guided by the operator is computed, and the balance node operator is used for eliminating the minimum value of MII. At this time, the balance node operator is called the shared balance node operator.

Step 4: After subtracting a shortest path from a path guided by the multi-fan-out operator, whether a current shared balance node operator is a multi-fan-out operator or not is determined, and steps 2 and 3 are repeated until MII of the paths guided by the multi-fan-out operator is all eliminated to 0.

Step 5: All of paths of the current operation are traversed, and steps 2 to 4 are repeated until MII of all of the paths is eliminated to 0, and then the operation is ended.

It should be noted that a condition of "MII=0" is an ideal goal, but it may not be satisfied after compilation optimization. However, as long as the MII is made smaller after optimization as possible, it will be beneficial to improve performance.

Figure 4:
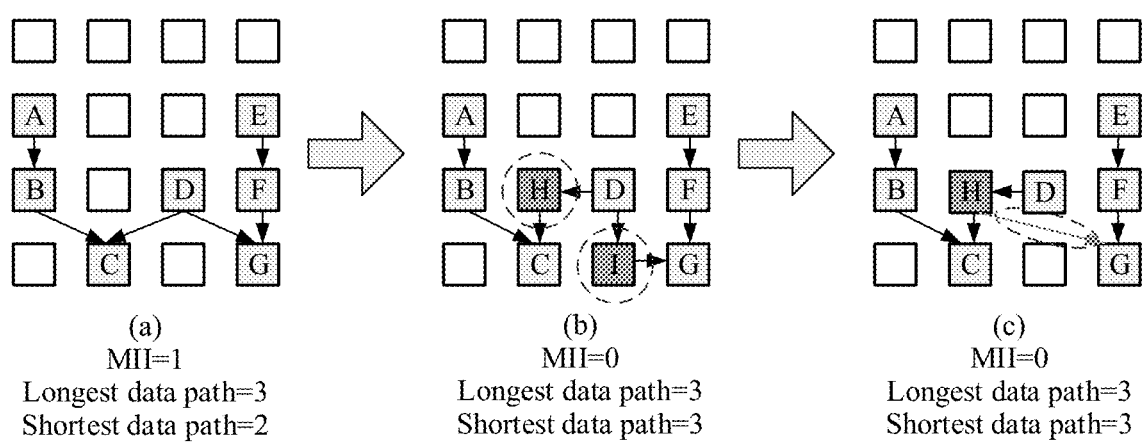
FIG. 4 is a sharing example of a transfer operator according to the present disclosure.

The example is as follows: as shown in FIG. 4(a), it is a given data flow graph with a multi-fan-out operator, in which a node D is a multi-fan-out node. For this type of operator, according to a conventional method, the operator is analyzed according to each different path, by directly inserting a balance node operator in each path to reduce the MII, as shown in FIG. 4(b), thus improving the pipeline performance. However, in some cases of resource shortage, a series of performance problems may be caused. For a reconfigurable computing unit, an operator input source of each line can be an output of a previous line, an output of a current line or a storage unit. For the node D, its balance node operators inserted in multiple paths act the same. Therefore, a transfer operator of multi-fan-out operator paths is shared by the multiple paths, as shown in FIG. 4(c), thus minimizing the computing resources and maximizing the performance.

Figure 5:
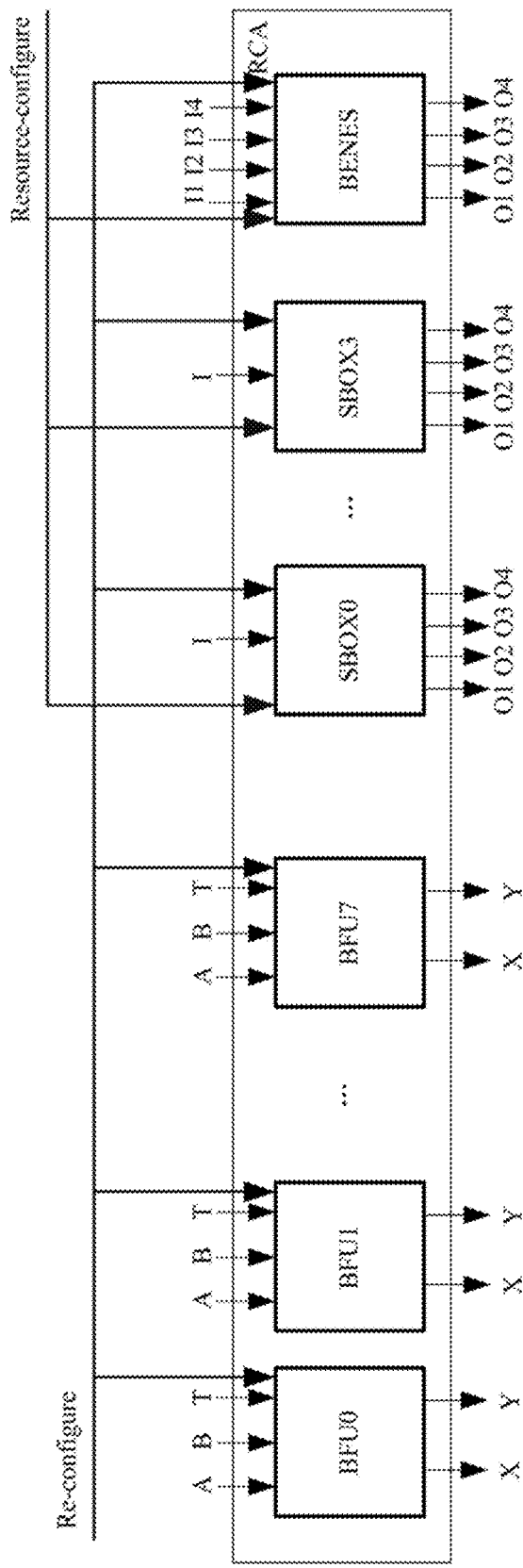
FIG. 5 is an example of an optimized reconfigurable high-performance compiler.

Compared with a common balance node operator, the shared balance node operator is optimized in operator resources, and the more multi-fan-out operators, the greater the optimization strength. In this type of computationally intensive algorithm such as encryption algorithm, the shared balanced node solution has achieved remarkable advantages. In the present disclosure, the shared balance node operator is used for optimizing the reconfigurable high-performance compiler oriented to cryptographic algorithms. As shown in FIG. 5, 8 BFUs (basic arithmetic units), 4 SBOXs (nonlinear permutation tables) and 1 BENES (bit permutation) are used as basic operators to form an RCA (reconfigurable arithmetic unit). BFU implements most basic operations in the cryptographic algorithms, for example, SU supports logical shift and arithmetic shift functions; LU supports a basic XOR function; AU supports addition and subtraction operations; and MU supports a multiplication operation. These operations do not need additional resource configuration information, and with three inputs, two output results can be obtained under different reconfiguration configurations. SBOX implements a function of lookup table, which provides convenience for a nonlinear operation in the cryptographic algorithm. BENES supports a big-little endian conversion function to ensure correctness of data on different processors. Among these operators, SBOX and BENES need extra resource configuration, and it takes a certain amount of time to load the resource configuration before each RCA operation. An actual operation of RCA is configured by the compiler, and performance and resource overhead are also determined by optimization strength of the compiler. In terms of hardware, a cryptographic reconfigurable computing module is loaded in a hardware system as a peripheral, and a compilation configuration code can be written through a PCIe bus or a system AXI bus. In an actual encryption process, resource optimization and performance optimization brought by the reconfiguration configuration generated by the shared balance node operator of the compiler have been greatly improved.

Figure 6:
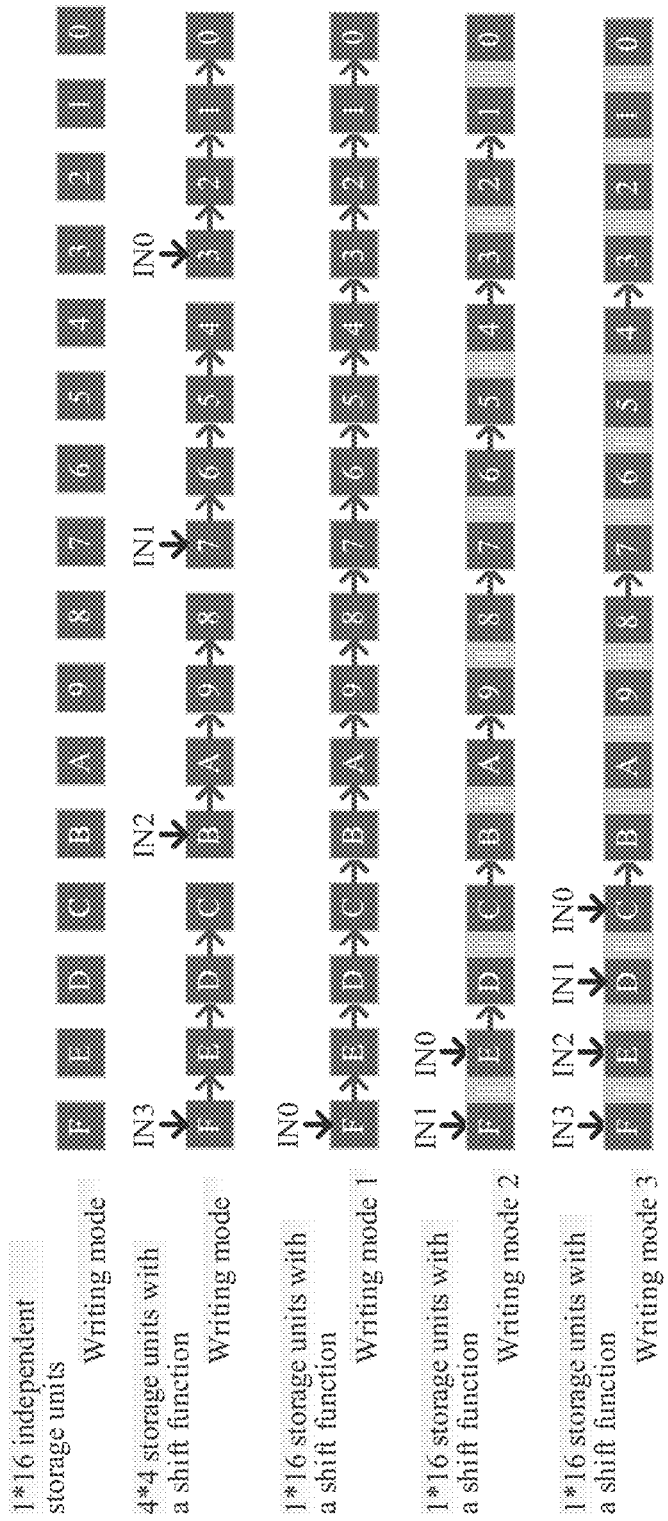
FIG. 6 is a schematic diagram of a SREG module unit according to the present disclosure.

In exploring a mapping solution of a cryptographic algorithm, although a first object to be explored is one of rounds of loops, a whole mapping process is overall mapping of multi rounds of loops and multi rounds of loops outside the loop body, so influence of the communication of multi rounds of loops on the algorithm performance should also be considered. Due to logical characteristics of hardware, an operator input of each line can only come from an output of an operator of a previous line, an output of a current line operator, or the storage unit, so there may be a problem that data communication cannot be carried out between loop bodies. If a restriction is added that an output of a loop body must be in a last line and an input must be in a beginning line, the mapping may fail because an optimal mapping solution cannot be found for the mapping due to such a harsh restriction. In the present disclosure, data transfer and communication are carried out through the storage data unit SREG, so that input data received by each input operator of a second round of loop is independent, and thus it is ensured that performance indexes of a first round of loop are remained in the second round of loop. As shown in FIG. 6, it is a schematic diagram of the SREG, which has three operation modes, namely modes respectively with 1*16 independent read-write modules, 4*4 modules with a shift function, and 1*16 modules with a shift function. The modules have 16 independent storage units, with each line having four write ports, and contain both storage and shift functions, which have great influence on algorithms with vector shift like a hash algorithm. Compared with MEM storage units, in the SREG, correct data can be read at the next line after writing in the current line. As a result, data delay may not be caused, connection lines for data communication are reduced and use of additional operators are increased, and correct transmission and communication of data can be ensured. In a process of compilation generation for SREG:

Firstly, whether there is data dependency in rounds of loops of the encryption algorithm or not is determined. If there is the data dependency in the rounds of loops of the encryption algorithm, the SREG is considered to replace MEM as an intermediate memory.

Secondly, considering release of the SREG, as a fast memory, resource consumption of the SREG with a same capacity must be greater than that of the MEM; and considering reuse characteristics of the SREG, the SREG needs to be released after completion of this round of data transfer, and an idle flag is given.

Finally, considering using priority of the SREG, priority of data dependence in an inner round of loop of cryptographic algorithm is highest, priority of data dependence between cryptographic algorithms is second highest, and priority of the SREG's characteristic shift function is lowest.

The SREG designed by the above design rules functions well in data transfer in an actual reconstruction and compilation process of general cryptographic algorithms. In compilation of the cryptographic algorithm of this design, ciphertext of each round of encryption in an AES-CBC encryption mode is used as initial data of a second round of encryption. In order to ensure consistency between loops, a conventional compiler needs to use a memory to store the data while determining the ciphertext as a result output, which resulting in inability to obtain initial data of a next round immediately; and in order to ensure correctness of the algorithm, the compiler adopts a method of adding an idle round operation, which reduces operation efficiency. With a SREG structure being added, this problem is well solved by fast access characteristics of the SREG.

Technical means disclosed in the solutions of the present disclosure are not limited to those disclosed in the above embodiments, but also include technical solutions composed of any combination of the above technical features. It should be noted that some improvements and modifications made by those of ordinary skill in the art without departing from technical principle of the present disclosure shall fall within the scope of the protection of the present disclosure.

What is claimed is:

1. A loop array mapping method of a shared balance operator based on a reconfigurable cryptographic algorithm implemented in a reconfigurable operation unit (RCA), comprising the following steps:
   step 1: computing path lengths of all of paths of a current operation, and obtaining at least one minimum iteration interval (MII) of each path according to path length difference between a current path and a maximum path;
   step 2: determining whether a currently processed operator is a multi-fan-out operator or not; if the currently processed operator is the multi-fan-out operator, performing step 3; and if the currently processed operator is not the multi-fan-out operator, using a linear basic logic computation unit (BFU) of the reconfigurable operation unit (RCA) to implement the reconfigurable cryptographic algorithm for reducing the MII of a path guided by the processed operator;
   step 3: for the multi-fan-out operator, computing a minimum value of the MII of all of paths guided by the processed operator, and using the BFU of the reconfigurable operation unit (RCA) as a shared balance node operator to implement the reconfigurable cryptographic algorithm for reducing the minimum value of the MII;
   step 4: after subtracting a shortest path from a path guided by the multi-fan-out operator, determining whether a current shared balance node operator is a multi-fan-out operator or not, and repeating steps 2 and 3 until the MII of the paths guided by the multi-fan-out operator is all minimized; and
   step 5: traversing all of paths of the current operation, and repeating steps 2 to 4 until the MII of all of the paths is minimized, and then ending the operation.

2. The loop array mapping method of a shared balance operator based on a reconfigurable cryptographic algorithm according to claim 1, wherein the MII in steps 4 and 5 is eliminated to 0.

3. The loop array mapping method of a shared balance operator based on a reconfigurable cryptographic algorithm according to claim 1, wherein a way of using the BFU comprises: adding another BFU for data transfer.

4. The loop array mapping method of a shared balance operator based on a reconfigurable cryptographic algorithm according to claim 1, wherein when the BFU is used for optimizing a whole mapping graph, two longest input paths among the data paths are optimized firstly; and when the two longest paths are balanced, a second longest input path is selected for optimization analysis until input operator paths are balanced or the MII of the input operator paths is minimized in the whole graph.

5. The loop array mapping method of a shared balance operator based on a reconfigurable cryptographic algorithm according to claim 1, wherein the shared balance node operator in the multi-fan-out operator path is shared in multiple paths.

6. The loop array mapping method of a shared balance operator based on a reconfigurable cryptographic algorithm according to claim 1, wherein in multi rounds of loops, data transfer and communication are carried out through a storage data unit (SREG), so that input data received by each input operator of a second round of loop is independent, and performance indexes of a first round of loop are remained in the second round of loop.

7. The loop array mapping method of a shared balance operator based on a reconfigurable cryptographic algorithm according to claim 6, wherein it is determined that the SREG is used as an intermediate memory when there is data dependency in a round of loop.

8. The loop array mapping method of a shared balance operator based on a reconfigurable cryptographic algorithm according to claim 6, wherein the SREG is released after completion of this round of data transfer, and an idle flag is given.

9. The loop array mapping method of a shared balance operator based on a reconfigurable cryptographic algorithm according to claim 6, wherein using priority of the SREG is as follows: priority of data dependence in an inner round of loop of cryptographic algorithm is highest, priority of data dependence between cryptographic algorithms is second highest, and priority of the SREG's characteristic shift function is lowest.

* * * * *